R. BEAN.

Force-Pump.

No. 8,631. Reissued Mar. 25, 1879.

WITNESSES

Frank C. L. Durand

J. J. McCarthy

By

INVENTOR

Roscoe Bean

Alexander Mason

ATTORNEYS

N. PETERS, PHOTO-LITHOGRAPHER, WASHINGTON, D. C.

UNITED STATES PATENT OFFICE.

ROSCOE BEAN, OF HUDSON, MICHIGAN.

IMPROVEMENT IN FORCE-PUMPS.

Specification forming part of Letters Patent No. 175,588, dated April 4, 1876; Reissue No. 8,631, dated March 25, 1879; application filed February 25, 1879.

*To all whom it may concern:*

Be it known that I, ROSCOE BEAN, of Hudson, in the county of Lenawee and State of Michigan, have invented certain new and useful Improvements in Force-Pumps; and I do hereby declare that the following is a full, clear, and exact description of the invention, reference being had to the accompanying drawings, and to the letters of reference marked thereon, which form a part of this specification.

The nature of my invention relates to force-pumps; and it consists in a tubular air-chamber attached to the pump-stock or platform-flange, and connecting to and opening into the cylinder or chamber, and forming also a support for the same.

My invention further consists in a supporting tubular air-chamber and discharge-pipe attached to the pump-stock or flange-plate, and connecting with and opening into a cylinder or chamber; also, in the combination of parts, as will be hereinafter more fully set forth, and pointed out in the claims.

In order to enable others skilled in the art to which my invention appertains to make and use the same, I will now proceed to describe its construction and operation, referring to the annexed drawings, in which—

Figure 1:
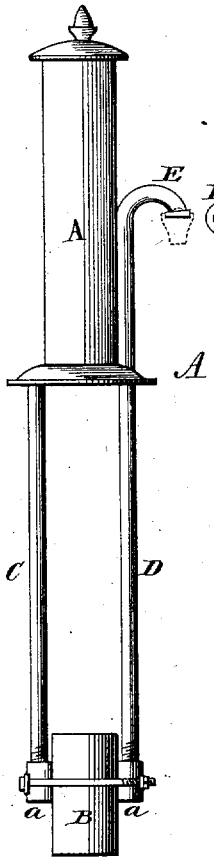
Figure 3:
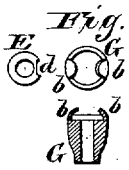
Figure 2:
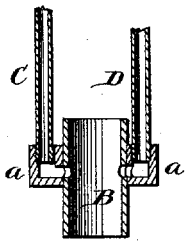

Figure 1 is a side elevation of a pump embodying my invention. Fig. 2 is a vertical section of the cylinder and portions of the air-chamber and discharge-pipe. Fig. 3 shows a coupling for connecting hose to the spout.

A represents an ordinary pump-stock connected to the platform-flange or flange-plate A′. B is the pump-cylinder, connected to the pump-stock A or flange A′ by means of two tubes, C and D. The lower ends of these tubes connect with the cylinder B, and open into the same or into a chamber, *a*, interposed in any suitable manner, the object being simply to form a connection between said cylinder and the tubes.

The tube C is closed at its upper end, and forms not only a support for the pump, but also the air-chamber. This air-chamber, being in the form of a tube, has a direct action on the water, and has also greater power for forcing water, as well as to give it a more steady action.

The pipe D extends a suitable distance above the flange A′, and forms the discharge-pipe, as well as the second support for the pump-cylinder.

By this mode of connecting the pump-stock or flange with the cylinder or chamber a substantial support is formed, which is very simple and readily put together. By these means, also, the cylinder may be placed down in the well below the freezing-point; and in cisterns, or where the cylinder is submerged, it will not fill up with water, and at the same time connects and supports the cylinder, however deep the well may be.

By having two openings, (one for the discharge and one for the air-chamber,) it gives a place for the air to have a direct action on the water while in use, giving it an even, steady stream, and a direct discharge for the water, independent of the air-chamber.

The upper end of the discharge-pipe D is curved to form the spout E, and to the same a hose may be attached by means of a coupling, G. This coupling is used with one slot, *d*, on the spout and two lips, *b b*, on the coupling.

The advantage of only one slot *d* is, that when in use, forcing and pulling on the hose, the coupling tightens, and will not come off, as it will when two slots are used.

Having thus fully described my invention, what I claim as new, and desire to secure by Letters Patent, is—

1. A supporting tubular air-chamber attached to pump-stock or platform-flange, connecting to and opening into a cylinder or chamber.

2. A supporting tubular air-chamber and discharge-pipe, attached to pump-stock or flange-plate, connecting to and opening into a cylinder or chamber.

3. In a pump, a tubular air-chamber, forming a support for the lower part of the pump, and connecting the same with the upper part, substantially as herein set forth.

4. In a pump, a tubular air-chamber and a discharge-tube, forming supports for the lower part of the pump, and connecting the same with the upper part, substantially as herein set forth.

5. The cylinder B, having the air-chamber and discharge-pipe opening into the same on opposite sides, substantially as and for the purposes herein set forth.

In testimony that I claim the foregoing I have hereunto set my hand this 21st day of February, 1879.

ROSCOE BEAN.

Witnesses:
JOHN BEAN,
T. W. TOLCHARD.